Figure 1:
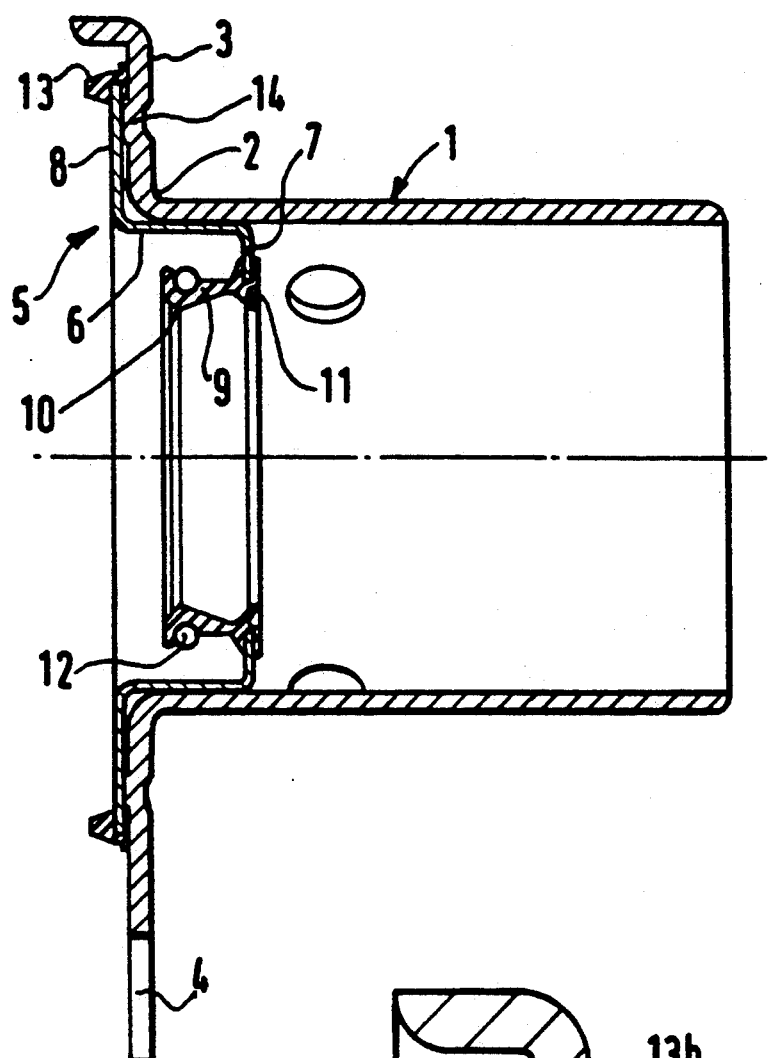

United States Patent

Caillaud et al.

Patent Number: 5,299,677
Date of Patent: Apr. 5, 1994

[54] GUIDE-TUBE WITH INTEGRAL SEALING FOR MOTOR VEHICLE GEARBOX CLUTCH RELEASE BEARING

[76] Inventors: Claude Caillaud, La cote, 52200, Jorquenay; Louis-Claude Garcia, Les Roises, 52200, Langres, both of France

[21] Appl. No.: 960,864

[22] Filed: Oct. 14, 1992

[30] Foreign Application Priority Data

Oct. 15, 1991 [FR] France .................. 91 12672

[51] Int. Cl.$^5$ ............... F16D 23/12; F16D 13/58; B60K 17/00
[52] U.S. Cl. .................. 192/115; 192/98; 277/153; 277/183; 384/16; 384/296
[58] Field of Search ............ 192/98, 110 B, 115; 277/153, 183; 384/29, 16, 296

[56] References Cited

U.S. PATENT DOCUMENTS

| | | | |
|---|---|---|---|
| 2,692,785 | 10/1954 | Reynolds | 277/183 |
| 2,873,153 | 2/1959 | Haynie | 277/153 X |
| 3,606,352 | 9/1971 | Lutz | 277/183 X |
| 4,911,277 | 3/1990 | Parzefall | 192/110 B |

FOREIGN PATENT DOCUMENTS

| | | | |
|---|---|---|---|
| 0301965 | 2/1989 | European Pat. Off. | 192/98 |
| 0336843 | 10/1989 | European Pat. Off. | |
| 4040990 | 6/1991 | Fed. Rep. of Germany. | |
| 1083765 | 1/1955 | France | 277/183 |
| 2305639 | 10/1976 | France | 192/98 |
| 2040384 | 8/1980 | United Kingdom. | |

*Primary Examiner*—Rodney H. Bonck

[57] ABSTRACT

The invention relates to a guide-tube with integral sealing for motor vehicle gearbox clutch release bearing, comprising a tubular sleeve able to be engaged axially around the input shaft of the gearbox and having a radial bearing surface made from one part, forming a plate for fixing the guide-tube to the outer face of the wall of the casing of the gearbox, and a sealing ring with a lip engaged inside the sleeve.

The sealing ring with a lip comprises a reinforcing member (5) comprising a tubular bearing surface (6) able to be engaged by force in the tubular sleeve (1) of the guide-tube, the said tubular bearing surface (6) being extended at each of its ends by a radial bearing surface, one (7) directed towards the inside and at the end of which a sealing gasket with a lip (9) is made and the other (8) directed towards the outside and on which an annular sealing bead (13) is made, able to come into contact with the external face of the wall of the casing.

7 Claims, 1 Drawing Sheet

GUIDE-TUBE WITH INTEGRAL SEALING FOR MOTOR VEHICLE GEARBOX CLUTCH RELEASE BEARING

The present invention relates to a guide-tube with integral sealing for motor vehicle gearbox clutch release bearing.

In a general manner, clutch release bearings slide on a tubular sleeve engaged axially around the input shaft of the gearbox and force fitted into a bore of the casing of the latter. A sealing ring of the type with lips is inserted between the casing and the input shaft.

In conventional embodiments, the sealing ring is a part assembled separately from the sleeve forming a guide-tube.

This solution exhibits the drawback that, when it becomes necessary to change the sealing ring following wear of the latter, it is necessary to completely dismantle the gearbox.

The Applicant Company describes in its French Patents 87 17701, 88 04448 and 89 17103, guide-tubes with integral sealing for a motor vehicle gearbox clutch release bearing so as to permit dismantling and replacement of a defective sealing gasket by separating the gearbox from the engine without having to dismantle the gearbox itself.

Moreover, the guide-tubes described in the Applicant Company's prior patents quoted hereinabove make it possible to ensure, apart from the dynamic sealing function regarding the input shaft of the gearbox, obtained by the latter pressing on the lip of the sealing gasket, on the one hand, a centering of the guide-tube relative to the casing of the gearbox and, on the other hand, static sealing between the guide-tube and the casing.

The present invention proposes to provide a new structure of guide-tube with integral sealing fulfilling the same functions as the Applicant Company's prior guide-tubes, and being more simple and economical to implement industrially.

The subject of the present invention is a guide-tube with integral sealing for motor vehicle gearbox clutch release bearing, comprising a tubular sleeve able to be engaged axially around the input shaft of the gearbox and having a radial bearing surface made from one part, forming a plate for fixing the guide-tube to the outer face of the wall of the casing of the gearbox, and a sealing ring with a lip engaged inside the sleeve, characterized in that the sealing ring with a lip comprises a reinforcing member comprising a tubular bearing surface able to be engaged by force in the tubular sleeve of the guide-tube, the said tubular bearing surface being extended at each of its ends by a radial bearing surface, one directed towards the inside and at the end of which a sealing gasket with a lip is made and the other directed towards the outside and on which an annular sealing bead is made, able to come into contact with the external face of the wall of the casing. Preferably, the annular bead is made at the end of the radial bearing surface of the reinforcing member.

When the sealing ring is engaged by force inside the tubular sleeve of the guide-tube, the radial bearing surface, directed towards the outside, of the reinforcing member of the sealing ring becomes arranged substantially parallel to the radial bearing surface extending with the tubular sleeve of the guide-tube, and the annular bead made at its end thus ensures a static sealing contact between the radial bearing surface of the guide-tube and the external face of the wall of the casing.

The annular sealing bead advantageously exhibits a main portion, for example of substantially trapezoidal cross section, projecting from the radial bearing surface of the reinforcing member, which carries it, in the direction of the wall of the casing, the annular sealing bead preferably further comprising, on the face opposite the radial bearing surface of the reinforcing member, a portion making it possible to ensure sealing between the radial bearing surface of the said reinforcing member and the radial bearing surface forming a plate for fixing the guide-tube.

Advantageously, the radial bearing surface forming a plate for fastening the guide-tube is deformed, at least locally so as to exhibit zones for contact with the radial bearing surface of the reinforcing member of the sealing ring. Thus, according to the invention, there is provided, for example, a zone deformed into the shape of a crown on the said radial bearing surface forming a plate for fixing the guide-tube making a rib projecting towards the radial bearing surface of the reinforcing member. This zone is preferably made so as to come into contact with the radial bearing surface of the reinforcing member at a short distance, towards the inside, from the annular sealing bead made a the end of the radial bearing surface of the reinforcing member.

Figure 2:
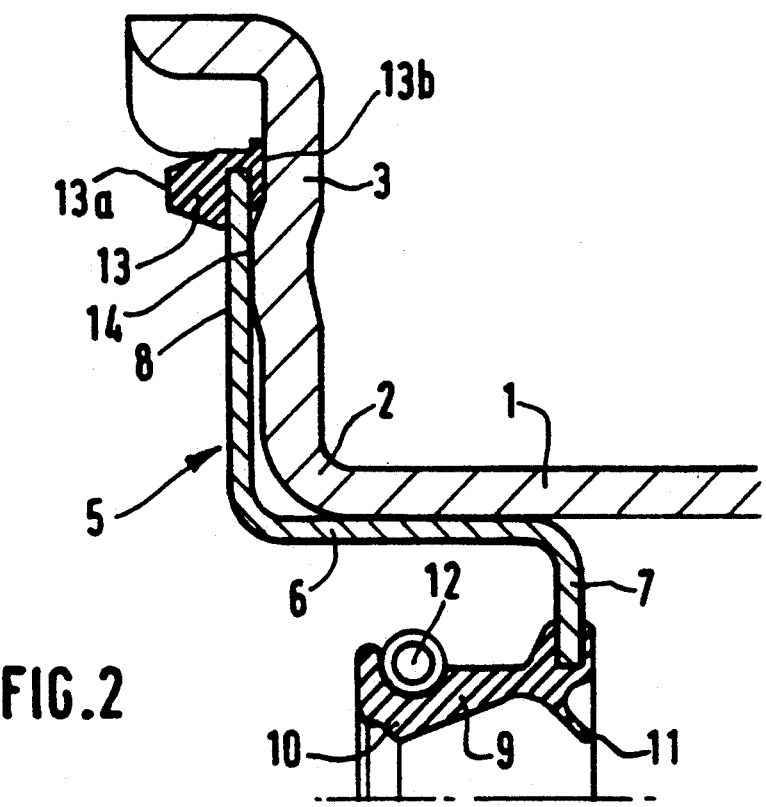

With the objective of making the invention better understood, an embodiment example being by no means limiting, will now be described with reference to the appended drawing in which:

FIG. 1 is a view in longitudinal section of a guide-tube with integral sealing according to the invention, FIG. 2 is an enlarged detail view.

The guide-tube according to the invention comprises a metal tubular sleeve 1 connected at its front end by a rounded part 2 to a radial bearing surface 3 equipped with peripheral cutouts 4 for the passage of fixing members, such as screws, onto the outer face of a gearbox casing (not shown).

The tubular sleeve 1 is engaged around the input shaft of the gearbox (not shown) mounted in a conventional manner in a bore of the casing (also not shown).

A clutch release bearing (not shown) slides in a conventional manner on the external wall of the tubular sleeve.

The guide-tube according to the invention comprises, engaged with force inside the tubular sleeve 1, a sealing ring designated overall by 5, and comprising a reinforcing member formed from a cylindrical bearing surface 6 extended at one end by a radial bearing surface 7 directed towards the inside and at its other end by a radial bearing surface 8 directed towards the outside.

The radial bearing surface 7, of smaller radial size, comprises at its end a dynamic sealing gasket 9, comprising a main sealing lip 10 and a secondary antidust sealing lip 11, the gasket 9 being pushed back in a conventional manner in the direction of the shaft by a coil garter spring 12.

At the end of the other radial bearing surface 8 of the reinforcing member, there is provided, according to the invention, an annular bead 13 comprising a main portion 13a intended to make a static sealing between the bearing surface 8 and the corresponding bearing face of the casing and a portion 13b, intended to make a static sealing between the radial bearing surface 8 of the reinforcing member and the radial bearing surface 3 upon clamping of the fixing elements engaged in the cutouts 4. The radial bearing surface 3 comprises a zone in the shape of a crown 14 bearing against the face opposite the radial bearing surface 8 of the reinforcing member of the sealing ring 5.

The bead 13 is deformed by crushing during assembly of the guide-tube against the outer face of the casing, which ensures good radial static sealing between the guide-tube and the casing.

Of course, the form of the bead 13 illustrated has no limiting feature.

In the same manner, the form of the dynamic sealing gasket 9 is also not limiting. The gasket 9 and the bead 13 may be made from different elastomer materials and/or in different colors.

The sealing ring comprising the static sealing bead 13 and the dynamic sealing gasket is advantageously factory pre-fitted into the tubular sleeve of the guide-tube 1, thus constituting a unitary assembly until fitting.

Although the invention has been described in conjunction with a particular embodiment, it is in no way limited thereto and other variants and modifications may be brought thereto without thereby leaving its scope, or its spirit.

We claim:

1. Guide-tube with integral sealing for motor vehicle gearbox clutch release bearing, comprising a tubular sleeve able to be engaged axially around the input shaft of the gearbox and having a radial bearing surface made from one part, forming a plate for fixing the guide-tube to the outer face of the wall of the casing of the gearbox, and a sealing ring with a lip engaged inside the sleeve, characterized in that the sealing ring with a lip comprises a reinforcing member (5) comprising a tubular bearing surface (6) able to be engaged by force in the tubular sleeve (1) of the guide-tube, the said tubular bearing surface (6) being extended at each of its ends by a radial bearing surface, one (7) directed towards the inside and at the end of which a sealing gasket with a lip (9) is made and the other (8) directed towards the outside and on which an annular sealing bead (13) is made, able to come into contact with the external face of the wall of the casing.

2. Guide-tube according to claim 1, characterized in that the said annular bead (13) is made at the end of the radial bearing surface (8) of the reinforcing member (5).

3. Guide-tube according to claim 2, characterized in that the annular bead (5) comprises a portion (13a) projecting from the radial bearing surface (8) of the reinforcing member (5), which carries it, in the direction of the wall of the casing and, on the face opposite the said radial bearing surface (8), a portion (13b) making it possible to ensure sealing between the said radial bearing surface (8) of the reinforcing member (5) and the radial bearing surface (3) forming a plate for fixing the guide-tube to the outer face of the wall of the casing of the gearbox.

4. Guide-tube according to claim 3, wherein said projecting portion (13a) has a substantially trapezoidal cross section.

5. Guide-tube according to claim 3, characterized in that said radial bearing surface (3) forming a plate for fastening the guide-tube is deformed, at least locally, to define zones (14) for contact with the radial bearing surface (8) of the reinforcing member of the sealing ring.

6. Guide-tube according to claim 5, wherein said radial bearing surface (3) forming a plate for fixing the guide-tube comprises a zone (14) making a rib projecting towards the radial bearing surface (8) of the reinforcing member (5).

7. Guide-tube according to claim 6, wherein said zone (14) is made so as to come into contact with the radial bearing surface (8) of the reinforcing member (5) near and towards the inside, from the annular sealing bead (13).

* * * * *